(12) United States Patent
Wenzel

(10) Patent No.: US 9,323,920 B2
(45) Date of Patent: Apr. 26, 2016

(54) DATA PROCESSING ARRANGEMENT AND METHOD FOR ENSURING THE INTEGRITY OF THE EXECUTION OF A COMPUTER PROGRAM

(71) Applicant: Infineon Technologies AG, Neubiberg (DE)

(72) Inventor: Andreas Wenzel, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 205 days.

(21) Appl. No.: 14/060,679

(22) Filed: Oct. 23, 2013

(65) Prior Publication Data

US 2015/0113637 A1    Apr. 23, 2015

(51) Int. Cl.
*G06F 21/52* (2013.01)

(52) U.S. Cl.
CPC .................................... *G06F 21/52* (2013.01)

(58) Field of Classification Search
None
See application file for complete search history.

(56) References Cited

U.S. PATENT DOCUMENTS

| | | | |
|---|---|---|---|
| 2006/0156005 A1* | 7/2006 | Fischer et al. | 713/176 |
| 2009/0113240 A1* | 4/2009 | Vera et al. | 714/17 |
| 2009/0183035 A1* | 7/2009 | Butler et al. | 714/48 |
| 2012/0233446 A1* | 9/2012 | Gammel et al. | 712/244 |

* cited by examiner

*Primary Examiner* — Lisa Lewis
*Assistant Examiner* — Henry Tsang

(57) ABSTRACT

According to one embodiment, a data processing arrangement is described comprising a processor configured to carry out a computer program including a plurality of program instructions; a signature determination arrangement configured to determine a signature of the program instructions carried out by the processor wherein the processor is configured to, when it carries out a program instruction of the plurality of program instructions which indicates the next program instruction of the plurality of program instructions to be carried out, provide information about the indication to the signature determination arrangement; wherein the signature determination arrangement is configured to take into account the information in the determination of the signature; and a detector configured to check, when the computer program is completely carried out, whether the determined signature is equal to a reference signature.

20 Claims, 6 Drawing Sheets

DATA PROCESSING ARRANGEMENT AND METHOD FOR ENSURING THE INTEGRITY OF THE EXECUTION OF A COMPUTER PROGRAM

TECHNICAL FIELD

The present disclosure relates to data processing arrangements and methods for ensuring the integrity of the execution of a computer program.

BACKGROUND

The manipulation of an executed instruction stream of a computer program can be detected by implementing a security functionality called instruction stream signature ISS. The instruction stream signature typically provides strong integrity protection for static parts of the flow of a computer program. For example, with an instruction stream signature the execution of any critical static part of a computer program can be strongly protected against manipulation by physical and logical attacks.

In addition to protecting static parts of the flow of a computer program, it is desirable to also protect dynamic parts of the flow of a computer program flow against manipulation.

SUMMARY

According to one embodiment, a data processing arrangement is provided including a processor configured to carry out a computer program including a plurality of program instructions; a signature determination arrangement configured to determine a signature of the program instructions carried out by the processor; a memory storing a reference signature predetermined for the computer program; wherein the processor is configured to, when it carries out a program instruction of the plurality of program instructions which indicates the next program instruction of the plurality of program instructions to be carried out, provide information about the indication to the signature determination arrangement; wherein the signature determination arrangement is configured to take into account the information in the determination of the signature; and a detector configured to check, when the computer program is completely carried out, whether the determined signature is equal to the reference signature.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

In the following, embodiments are described which allow protecting the dynamic parts of the flow of a computer program against manipulation. For example, indirect branches including a corresponding instruction fetch and conditional branches including a corresponding instruction fetch can be protected against manipulation. According to various embodiment as described below, the entity that determines the instruction stream signature for a computer program that is being carried out, also referred to as the signature determination arrangement in the following, is coupled with the data path. In other words, the signature determination arrangement receives results of the processing of the program instructions such as a jump address (e.g. indirect branch address) or the information whether a branch is taken, e.g. the evaluation of a branch condition, and takes them into account in the signature determination. This allows protecting dynamic parts of the instruction stream, in other words the computer program. The instruction stream can be protected by the instruction stream signature and the data operation (such as the determination of a jump address or the evaluation of a branch condition) can be protected by additional redundancy like double processing elements (such as double CPUs or ALUs) that perform the data operation. Taking into account the results of the processing in the signature determination allows protecting interoperation between the data path and the instruction stream, in other words the dependency of the instruction stream from the results of the data operations, for example conditional branches and indirect branches. Instruction stream signatures may thus for example be used as an integrity guard concept for chip cards or other secure components.

In the following, a data processing arrangement that may for example provide protection of indirect branches or conditional branches against manipulation is described.

Figure 1:
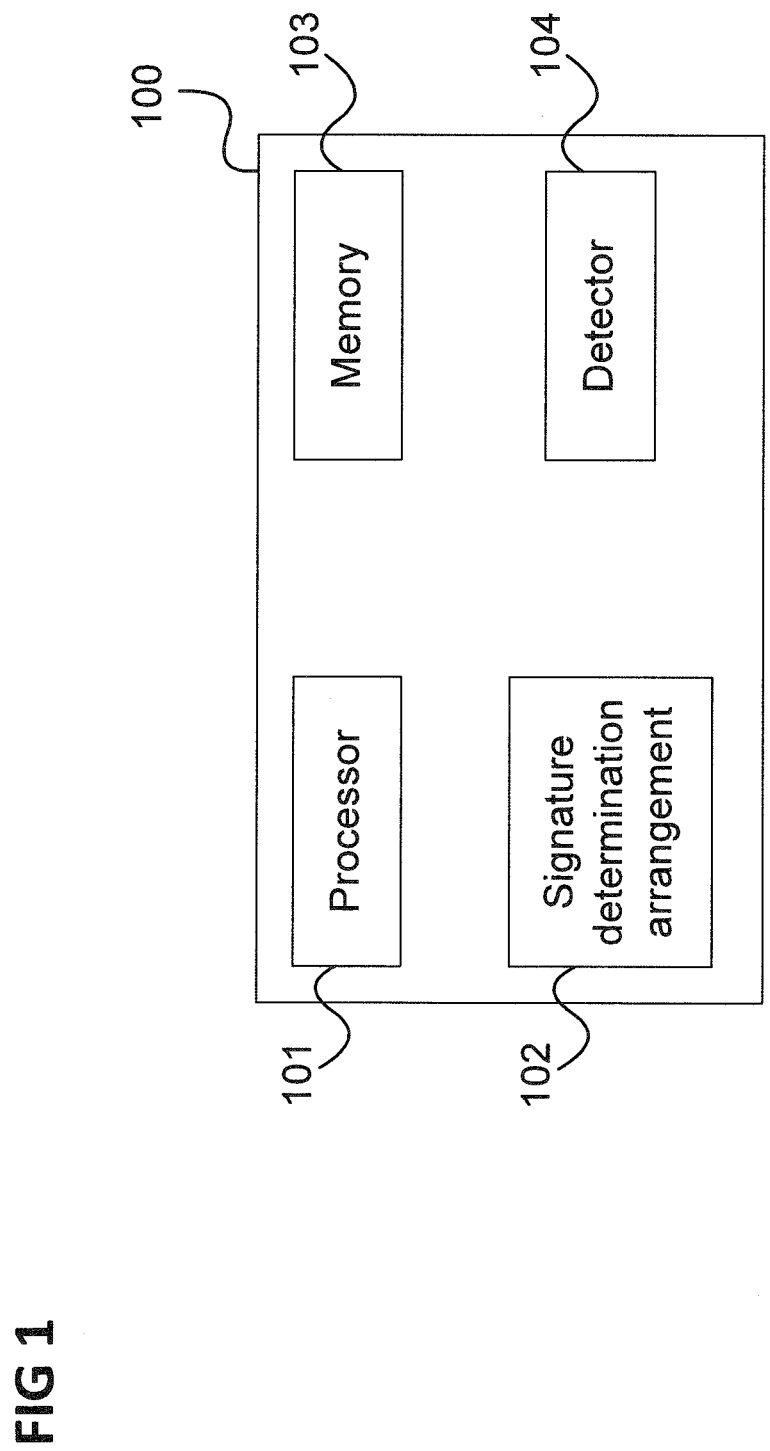
FIG. 1 shows a data processing arrangement according to an embodiment.

FIG. 1 shows a data processing arrangement 100.

The data processing arrangement 100 includes a processor 101 configured to carry out a computer program including a plurality of program instructions, a signature determination arrangement 102 configured to determine a signature of the program instructions carried out by the processor and a memory 103 storing a reference signature predetermined for the computer program.

The processor is configured to, when it carries out a program instruction of the plurality of program instructions which indicates the next program instruction of the plurality of program instructions to be carried out, provide information about the indication to the signature determination arrangement.

The signature determination arrangement 102 is configured to take into account the information in the determination of the signature.

The data processing arrangement further includes a detector 104 configured to check, when the computer program is completely carried out, whether the determined signature is equal to the reference signature.

In other words, the result of a program instruction (such as an indirect branch or a conditional branch) which indicates the next program instruction to be carried out (namely in form of the jump address or an indication of whether the branch is to be taken) is fed back to the signature determining entity which determines the signature based on this information. This may be done in such a way that the effect of taking into account the information in the signature determination (e.g. changing the signature by a certain value) is equal to the difference of the signature due to path that is taken to the program. For example, if an instruction is carried out due to a certain conditional branch being taken and is thus taken into account in the signature, taking into account the information about the branch being taken leads to the same signature as if the instruction was not carried out (and thus was not taken into account in the signature) such that the combination of the (correct) branch information and the (correct) instruction again leads to a valid signature. Alternatively, a plurality of valid reference signatures may be predefined and taking into account the information in the signature determination in combination with the signature update according to the correct instructions (i.e. the instructions which are to be carried out according to the information) leads to one of the predetermined reference signatures for each possible path through the computer program, i.e. each jump address and each taken or skipped branch.

For example, the program instruction of the plurality of program instructions which indicates the next program instruction of the plurality of program instructions to be carried out is a conditional branch.

The information about the indication is in this case for example information about whether the branch is to be taken or not.

As another example, the program instruction of the plurality of program instructions which indicates the next program instruction of the plurality of program instructions to be carried out is an indirect jump.

The information about the indication is in this case for example the memory address of the next program instruction to be carried out.

According to one embodiment, the signature determination arrangement is configured to update, starting from an initial value when the first program instruction is carried out, the signature for each program instruction of the plurality of program instructions carried out by the processor.

For example, the signature determination arrangement is configured to update the signature for each program instruction based on the program instruction.

The signature determination arrangement is for example configured to update the signature for each program instruction based on a representation of the program instruction.

For example, the signature determination arrangement is configured to update the signature for each program instruction based on an opcode of the program instruction.

According to one embodiment, the signature determination arrangement is configured to take into account the information such that the determined signature is, when the computer program is completely carried out, independent from the information if the next program instruction as indicated has been carried out by the processor.

It should be noted that the computer program may be a program part of a larger computer program. In other words, a check whether the determined signature is correct (i.e. equal to a predetermined reference signature) may be performed after a part of a larger computer program, i.e. may be an intermediate check with respect to the bigger computer program, after a part of the (larger) computer program has been carried out.

According to one embodiment, the signature determination arrangement is configured to take into account the information such that the determined signature is, when the computer program is completely carried out, equal to the reference signature if the next program instruction as indicated has been carried out by the processor and if the rest of the computer program has been correctly carried out.

According to one embodiment, the memory stores a plurality of reference signatures predetermined for the computer program and the detector is configured to check, when the computer program is completely carried out, whether the determined signature is equal to any of the reference signatures.

According to one embodiment, the signature determination arrangement is configured to update the signature for at least one program instruction based on the program instruction and based on a memory address of the program instruction. For example, the representation of the program instruction (e.g. the opcode) may be combined with the program instruction's address, e.g. by an xor-combination or by some other combination. This may be done for a part or for all (executed) program instructions of the computer program.

For example, the information about the indication is the memory address of the next program instruction to be carried out and the signature determination arrangement is configured to take into account the information such that taking into account the information negates the effect of the memory address of the program instruction on the update of the signature for the at least one program instruction if the memory address of the next program instruction to be carried out is equal to the memory address of the at least one program instruction.

According to one embodiment, the program instruction of the plurality of program instructions which indicates the next program instruction of the plurality of program instructions to be carried out is a conditional branch and the information about the indication is the information that the branch is to be been taken and the signature determination arrangement is configured to take into account the information such that taking into account the information negates the difference of the updates of the signature because of the program instructions being skipped or carried out due to the branch being taken.

According to one embodiment, the program instruction of the plurality of program instructions which indicates the next program instruction of the plurality of program instructions to be carried out is a conditional branch and the information about the indication is the information that the branch is not to be taken and the signature determination arrangement is configured to take into account the information such that taking into account the information negates the difference of the updates of the signature because of the program instructions being skipped or carried out due to the branch not being taken.

The signature is for example an instruction stream signature (ISS).

According to one embodiment, the processor includes a first program flow determiner configured to provide, for a program instruction of the plurality of program instructions which indicates the next program instruction of the plurality of program instructions to be carried out, information about the indication to the processor and a second program flow determiner configured to provide, for the program instruction, information about the indication to the signature determination arrangement.

For example, the first program flow determiner is configured to provide the information about the indication to an instruction fetching unit of the processor.

The first program flow determiner and the second program flow determiner are for example configured to determine indication independently from each other.

For example, the first program flow determiner is a first arithmetic logic unit (ALU) and the second program flow determiner is a second arithmetic logic unit.

The components of the data processing arrangement may be implemented using one or more circuits. In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Figure 2:
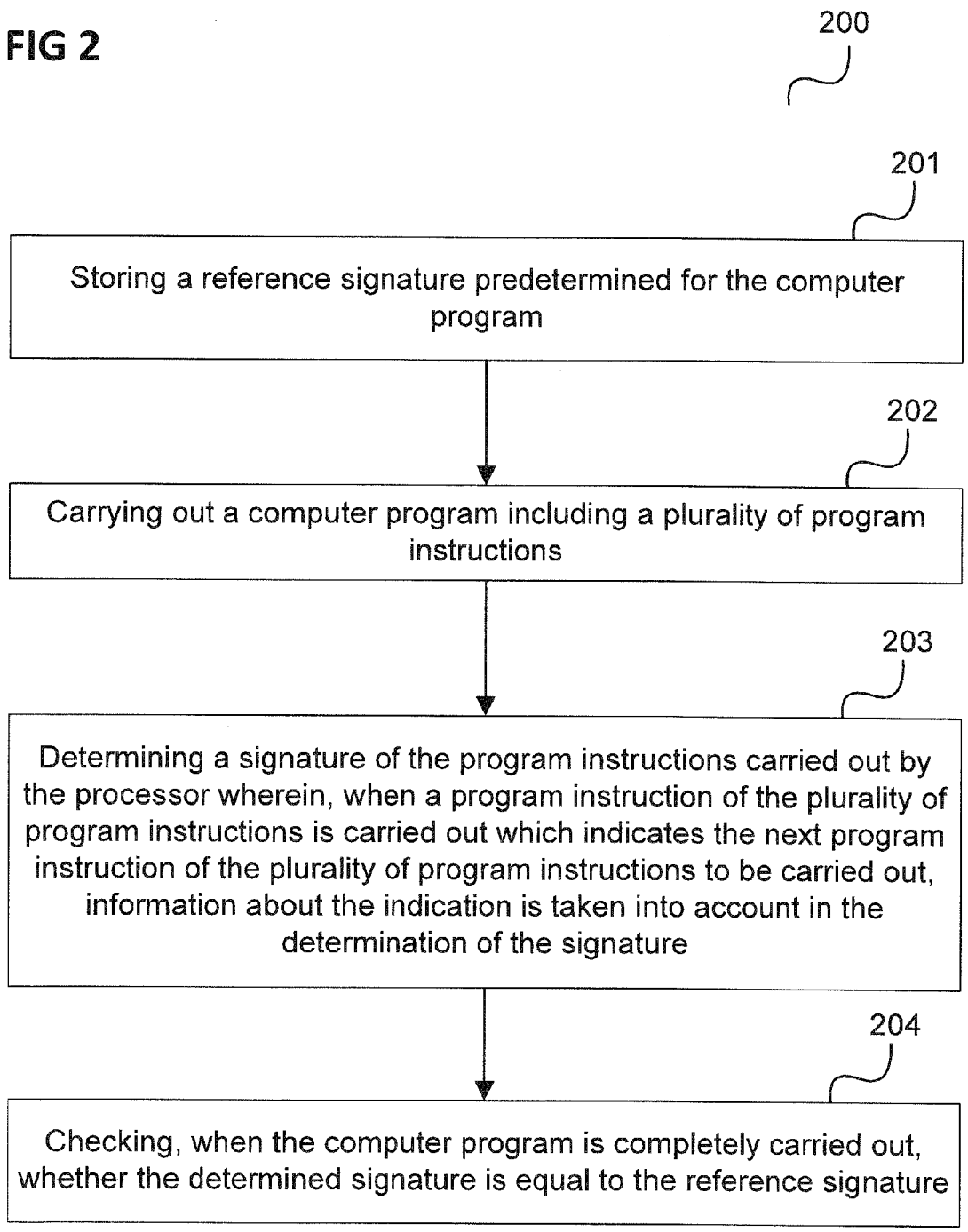
FIG. 2 shows a flow diagram illustrating a method for ensuring the integrity of the execution of a computer program.

The data processing arrangement for example carries out a method as illustrated in FIG. 2.

FIG. 2 shows a flow diagram 200.

The flow diagram 200 illustrates a method for ensuring the integrity of the execution of a computer program.

In 201, a reference signature predetermined for the computer program is stored.

In 202, a computer program including a plurality of program instructions is carried out.

In 203, a signature of the program instructions carried out by the processor is determined wherein, when a program instruction of the plurality of program instructions is carried out which indicates the next program instruction of the plurality of program instructions to be carried out, information about the indication is taken into account in the determination of the signature.

In 204, when the computer program is completely carried out, it is checked whether the determined signature is equal to the reference signature.

It should be noted that according to one embodiment, 203 is carried out in parallel to 204, i.e. the signature is determined in course of the execution of the computer program (e.g. is successively updated according to the executed program instructions).

It should be noted that embodiments described in context of the data processing arrangement 100 are analogously valid for the method as illustrated in FIG. 2 and vice versa. Furthermore, the features of the embodiments described in context of the data processing arrangement 100 may be used in any combination.

In the following, embodiments are described in more detail.

Figure 3:
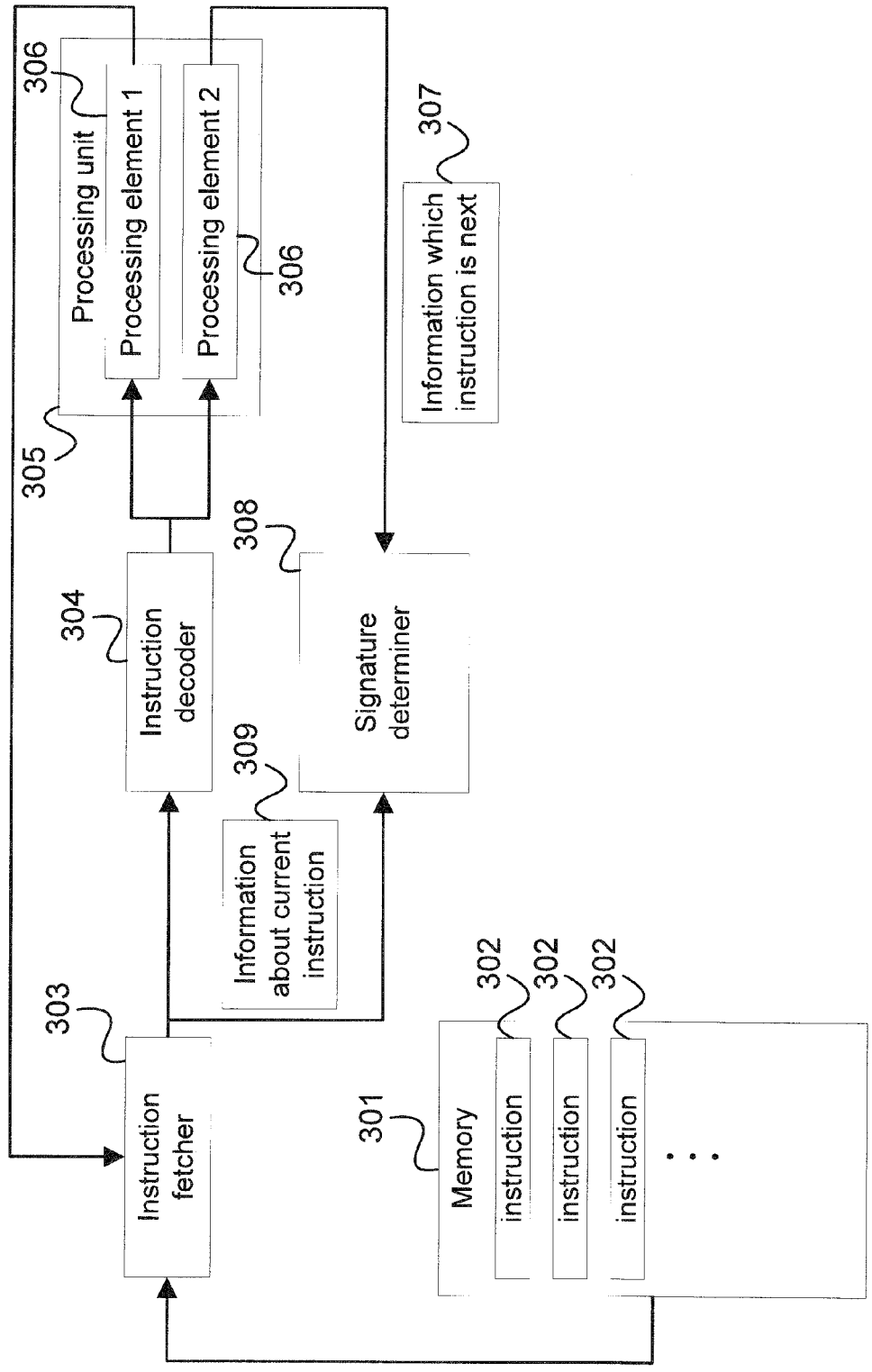
FIG. 3 shows a data processing arrangement according to one embodiment.

FIG. 3 shows a data processing arrangement 300 according to one embodiment.

The data processing arrangement 300 includes a memory 301 storing a plurality of program instructions 302 of a computer program.

The program instruction 302 which is the next to be carried out by the data processing arrangement 300 is fetched by an instruction fetching unit 303 and passed to an instruction decoder 304. The instruction decoder 304 decodes the program instruction 302 and controls a processing unit 305 accordingly. For example, it generates control signals according to the program instruction 302 for the processing unit such that the processing unit 305 carries out the program instruction 302. This may for example involve fetching data to be processed from the memory 301 and also writing back data resulting from the processing to memory 301. The processing unit 305 is for example an execution unit. The processing unit 305 includes (at least) two processing elements 306, e.g. ALUs (arithmetic-logic units). In other words, the processing unit is for example a dual-ALU execution unit.

The result of the execution of a program instruction 302 may determine the next program instruction 302 to be carried out, e.g. if the program instruction 302 is a conditional branch or an indirect branch or jump. In such a case, an indication of the next program instruction 302 to be carried out, e.g. a memory address addressing the next program instruction 302 to be carried out in memory 301 is fed back to the instruction fetching unit 303.

Further, in such a case, information 307 about which next program instruction has been indicated is provided to a signature determiner 308. The signature determiner 308 is further provided with information 309 about the instructions that are fetched from memory 301 by the instruction fetching unit 303.

For each instruction fetched by the instruction fetching unit 303 the signature determiner 308 updates a signature (starting from some initial value) for the computer program as executed. When the execution is complete, it compares the determined signature with a reference signature of the computer program (or with more than one allowed reference signatures). If the determined signature is equal to the reference signature (or any of the allowed reference signatures) the integrity of the program execution is confirmed.

The one or more reference signatures are for example determined by a software tool in advance, in other words by an offline tool, for example.

In the following, an example of the determination of a signature is given with respect to FIG. 4.

Figure 4:
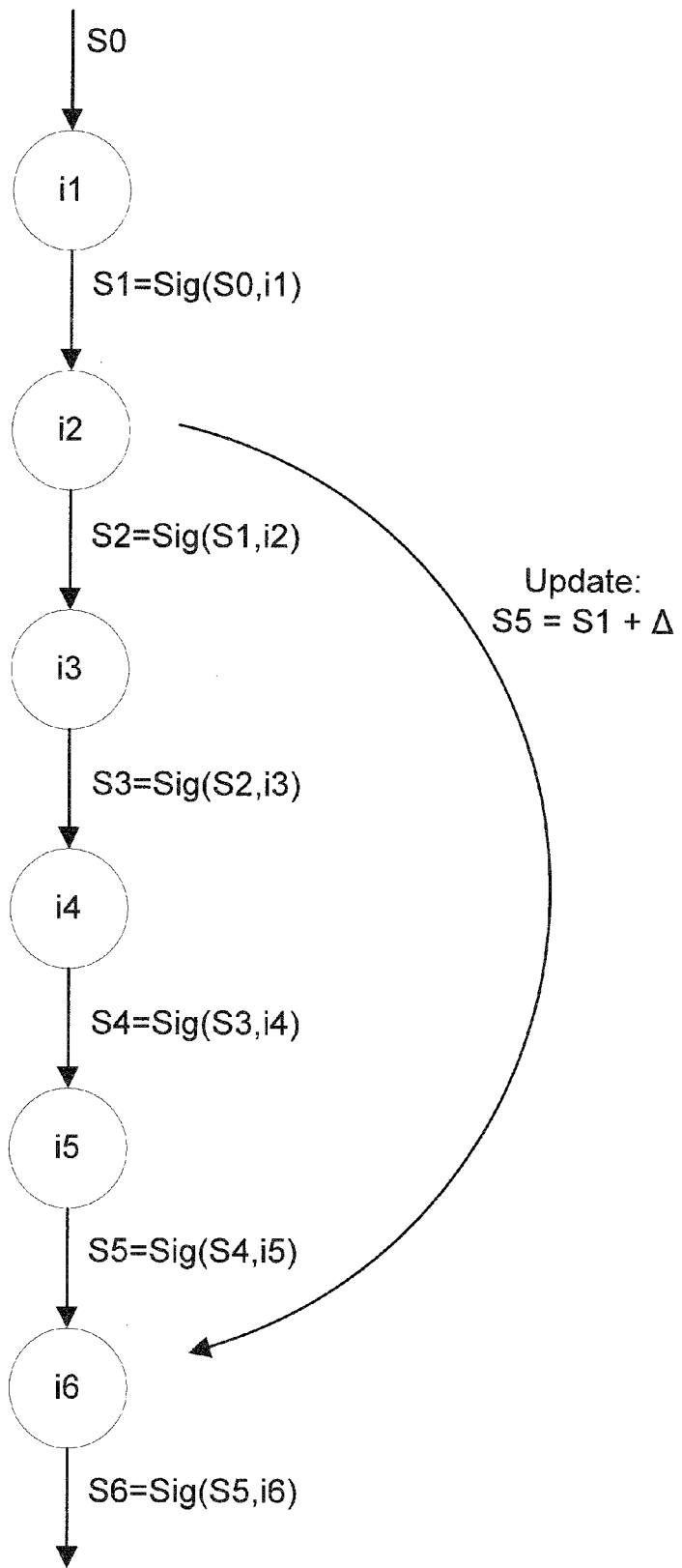
FIG. 4 illustrates signature determination in a program flow without branching according to an embodiment.

FIG. 4 illustrates signature determination in a program flow without branching.

In this example, the computer program includes six instructions i1 to i6. The signature determination starts with an initial value S0. For the first program instruction i1, the signature determiner 308 determines an updated signature S1 based on the previous signature S0 and information 309 about the instruction i1 (e.g. its binary representation in memory 301, e.g. its opcode instruction_opcode_i1) according to a predetermined signature determination function Sig, i.e. S1=Sig(S0, i1)=Sig(S0, instruction_opcode_i1).

Similarly, for the second instruction i2, an updated signature S2 is determined based on the previous signature S1 and information 309 about the instruction i2 according to the function Sig, i.e. S2=Sig(S1, i2).

This process continues until for the sixth instruction i6, the sixth update S6 of the signature has been determined according to S6=Sig(S5, i6). This value S6 may then be compared with the reference signature to determine whether the program has been correctly carried out (or may be further updated in case that more instructions follow).

It is assumed that the overall update from S1 to S5 is a certain value Δ, i.e. that S5=S1+Δ.

In the following, it is assumed that the second instruction i2 is a conditional branch that may branch to i6 in case a certain condition is fulfilled. In this case, the example of FIG. 4 can be seen as the case that the branch is not taken, i.e. that the condition is not fulfilled. The case that the branch is taken is illustrated in FIG. 5.

Figure 5:
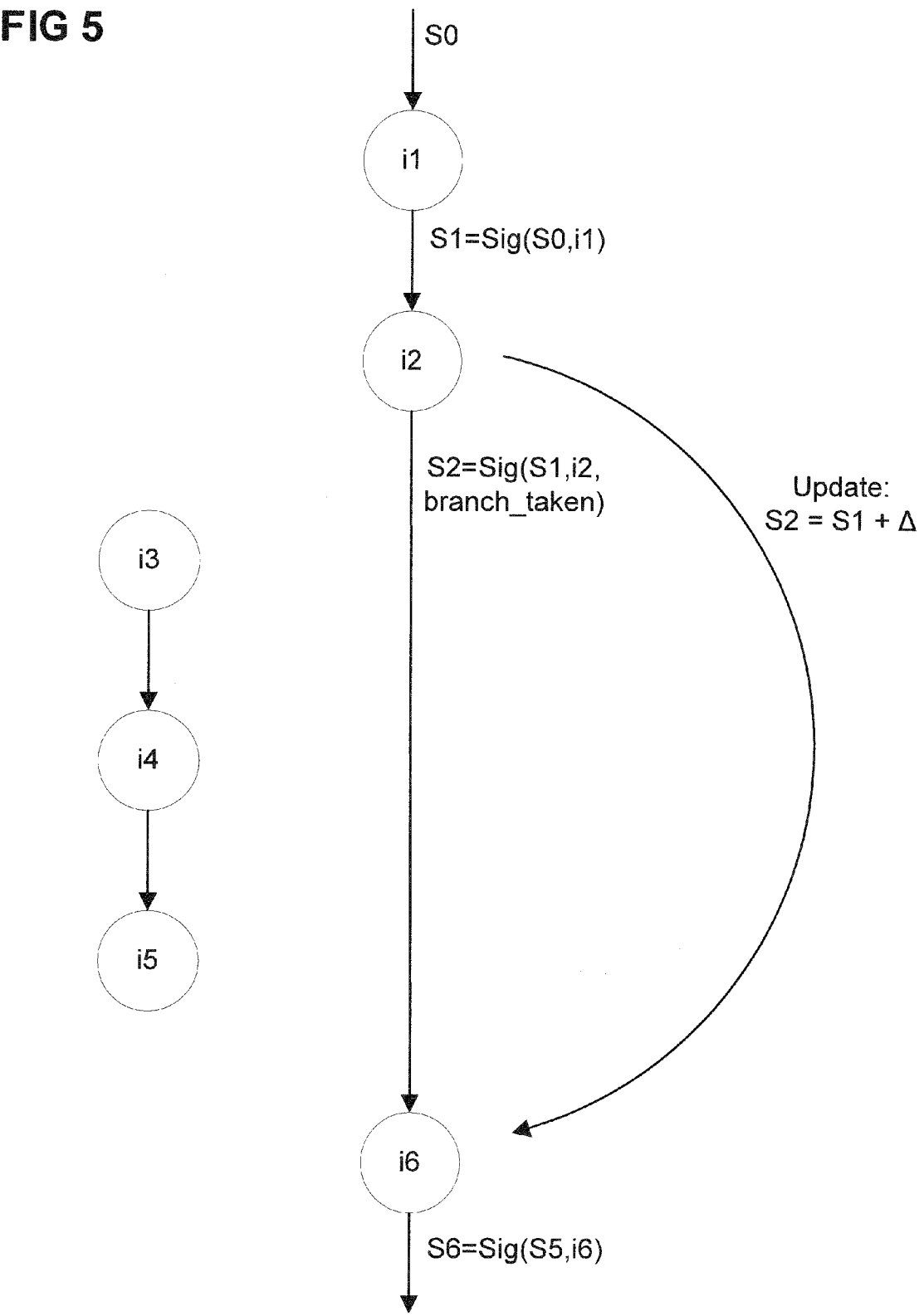
FIG. 5 illustrates signature determination in a program flow with conditional branching according to an embodiment.

FIG. 5 illustrates signature determination in a program flow with conditional branching.

In this case, it is assumed that as a result of i2, the branch to i6 is taken. Correspondingly, the processing unit 305 provides this information to the instruction fetching unit 303 such that the instruction fetching unit 303 fetches i6 next. Further, the information that the branch has been taken is fed as information 307 about the indicated next program instruction (in this case i6) to the signature determiner 308. This information, referred to as branch_taken in FIG. 5, is taken into account by the signature determiner 308. Namely, for the second instruction i2, the signature determiner 308 determines the signature S2 based on S1, i2 and the information branch_taken, i.e. S2=Sig(S1, i2, branch_taken).

Thereby, Sig(S1, i2, branch_taken) is defined in such a way, e.g. predetermined by a software tool in advance, that Sig(S1, i2, branch_taken)=S1+Δ. For example, a software tool determines Δ as it arises in the case of FIG. 4, i.e. from the updates according to i2, i3, i4 and i5 (in other words from information about the branch path) and defines Sig(S1, 12, branch_taken) to add this Δ to the previous signature S1. It should be noted that the software tool may also insert a corresponding instruction into the program, e.g. an instruction that is executed if the branch is taken and according to which the signature determiner 308 increases the signature by Δ.

Thus, the state of the signature before instruction i6 is both in the case illustrated in FIG. 4 and the case illustrated in FIG. 5 equal to S1+Δ. Thus, the signature is valid before instruction i6 if the branch condition was not fulfilled (i.e. no branch_taken input to signature determiner 308) and i3, i4, i5 have been correctly carried out the condition was fulfilled (i.e. branch_taken input to signature determiner 308) and i3, i4, i5 have been correctly skipped.

In case, for example, that an attacker achieves to manipulate the branch such that it is wrongly carried out, i.e., for example, the branch condition was not fulfilled but i3, i4, i5 have been skipped anyway the signature will in general not have the correct value since the signature determiner 308 will determine S2 as S2=Sig(S1, i2) which will not be further modified until i6.

Alternatively, Sig(S1, i2, branch_taken) may be defined to be different from S1+Δ. Further, Sig(S1, i2, branch_taken) may be defined to be different from Sig(S1, i2) such that in other words, the information branch_taken explicitly goes into the signature determination. In this case, since Sig(S1, 12, branch_taken) is different from S1+Δ, the signature at the end of the computer program execution will generally depend on whether the branch has been taken or not. Accordingly, two reference signatures may be predefined for the case of the branch being taken and for the case of the branch not being taken such that the case that the signature for i2 has been calculated as Sig(S1, i2, branch_taken) and instructions i3 to 15 have been skipped leads to one of the predetermined reference signatures (provided the rest of the computer program has been correctly carried out) and the case that the signature for i2 has been calculated as Sig(S1, i2) and instructions i3 to i5 have not been skipped leads to another of the predetermined reference signatures (provided the rest of the computer program has been correctly carried out).

Other realizations may also be used such as that Sig(S1, branch_taken) being different from Sig(S1, i2) (or a signature value Sig(S1, i2, branch_not_taken) in which the information about the branch not being taken goes explicitly into the signature) and different from S1+Δ and that the branch being skipped includes an additional instruction which includes a signature update such that for both paths (branch taken or branch not taken) the determined signature is the same (if the program has been correctly executed).

It should be noted that in the embodiment illustrated in FIG. 3, the branch condition is determined with redundancy by means of the two processing elements 306. This means that one of the processing elements 306 evaluates the branch condition of i2 and accordingly controls the instruction fetching unit 303 to fetch the instruction which is next according to the evaluation and the other one of the processing elements 306 evaluates the branch condition of i2 and accordingly provides the information 307 about the instruction which is next according to the evaluation to the signature determiner 308. Thus, the risk is reduced that an attacker is able to manipulate both the branching (i.e. manipulate which instruction is carried out next) and the signature determination.

It should be noted that instead of modifying the signature according to the information branch_taken in case the branch is taken the signature may also (in addition or alternatively) be modified according to an information branch_not_taken (supplied as information 307 to the signature determiner 308) in case the branch condition is not fulfilled. For this, the respective signature updates are chosen that valid combinations (i.e. condition not fulfilled and i2 to i5 carried out and condition fulfilled and i2 to i5 skipped) lead to the same signatures just before i6 while invalid combinations (such as condition not fulfilled and i2 to i5 skipped) lead to a different signature before i6.

Accordingly, the software tool, e.g. an offline instruction signature generation tool, which calculates the signature update value Δ and the signature reference values (and, in course of this the intermediate signature reference values S1, . . . S5) considers the additional condition signature information branch_taken, branch_not_taken. In the case of FIG. 5, the tool considers the branch_taken signature information in the branch path to calculate signature reference and update values. In case of a manipulation the offline calculated reference information (i.e. the signature reference determined in advance) will in general not fit to the online signature value (i.e. the signature determined during program execution) and the signature check at the end of the program execution will fail. In this case, an alarm for the user may for example be generated.

In the following, it is assumed that the second instruction i2 is an indirect branch. For example, instruction i2 is a jump instruction whose jump address is given by the content of a register of the processing unit 305.

Figure 6:
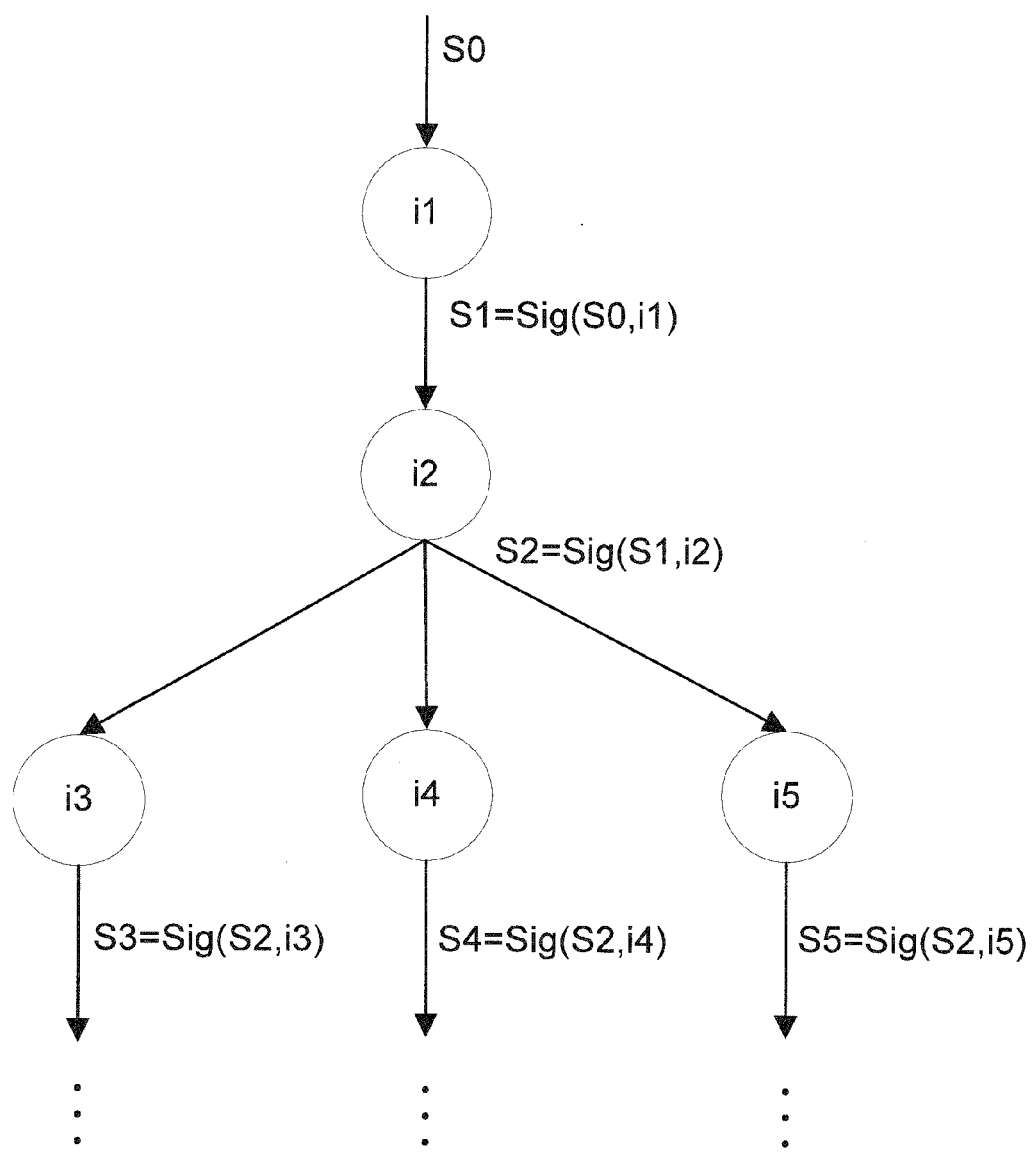
FIG. 6 illustrates signature determination in a program flow with indirect branching according to an embodiment.

FIG. 6 illustrates signature determination in a program flow with indirect branching.

For example, from i2, the program may jump to any of three instructions i3, i4 and i5. It is assumed that any of S3=Sig(S2, i3), S4=Sig(S2, i4) and S5=Sig(S2, i5) are valid intermediate signature values that lead to a valid signature value at the end of the program. This may for example be achieved by including (e.g. by the software tool in advance) in each of the three branches that are entered with i3, i4 or i5, respectively, an instruction which evens out the differences of the signatures between the three branches, e.g. at a point when the three branches again converge to a single branch. Alternatively, there may be plurality of valid signature values at the end of the program.

In the following, an embodiment is described which allows ensuring that the instruction which is addressed by the jump address of i2 has been carried out, i.e. that it may for example be detected that i5 has been carried out although the jump address of i2 addresses i3.

For this, information about the jump address is given to the instruction fetching unit 303 as well as to the signature determiner 308 as information 307 about which next program instruction has been indicated. As above, this may be done using redundancy, i.e. for example one of the processing elements 306 determines the jump address as provided to the instruction fetching unit 303 and the other of the processing elements 306 determines the jump address as provided to the signature determiner 308.

Further, for this, the instructions 302 are stored in the memory 301 such that for each instruction 302, its memory address is stored in addition to (e.g. in combination with) its representation (e.g. its opcode). For example, for an instruction, the data stored in memory 301 is given as memory_data=instruction_opcode xor f[instruction_address]

where f may be some function. This may for example be the identity or some function to bring the instruction_address to the same bit length as the opcode for the xor-combination.

Accordingly, for an instruction fetched by the instruction fetching unit 303 the fetched data includes information about its opcode and its memory address, e.g. is as above an xor-combination of the opcode and some function of its memory address.

The decoder is in this example configured to remove the added memory address information (e.g. by performing a further xor-combination of memory_data with f[instruction_address] resulting in the opcode) such that it decodes correctly.

The signature determiner 308 determines the updated signature value (Sx with x=4, 5, 6) as a function of the old signature value (S2) and the memory data of the instruction ix (referred to as memory_data_ix corresponding to memory_data as given above) and the information 307 (which is in this example the instruction address referred to as instruction_address_ix).

This is done in such a way that the updated in case of a correct execution, the effect of the address information in the memory data on the signature is negated, e.g. by a further xor-combination, e.g. according to $Sx=\mathrm{Sig}(S2,\text{update\_information})$ wherein
update_information=g(memory_data_ix, f(instruction_address_ix))=memory_data_ix xor f(instruction_address_ix)=instruction_opcode_ix
such that $Sx=\mathrm{Sig}(S2,\text{instruction\_opcode\_}ix)$ such that if the instruction fetching unit 303 has fetched the next instruction from an address from the memory 301 as also given by the information 307, a valid signature arises. In contrast, if the instruction fetching unit 303 has fetched the next instruction from an address from the memory 301 different from the one given by the information 307 the resulting signature will in general not be valid since the difference of the xor-combined addresses will be reflected in the signature. Thus, the signature check at the end of the program execution will fail and an alai in for the user may for example be generated.

It should be noted that the above xor-combination of the memory data with the instruction address as included in information 307 according to the function g may take place before the input of the instruction fetching unit 303 (instead of in course of within the signature determiner which would just receive the instruction opcode as input). In this case, the address information will already be removed (if the memory addresses determined by the processing elements 306 are the same) before the input to the signature determiner 308 and the decoder 304. A corresponding xor-combiner at the input of the instruction fetching unit 303 may be seen as being part of a signature determination arrangement which also includes the signature determiner 308.

Alternatively to the approach described above including storing the instructions 302 in the memory 301 such that for each instruction 302, its memory address is stored in addition to its representation by means of an xor-combination and performing an xor-combination of the memory data with the instruction address as described above, signature determination in a program flow with indirect branching may be performed as follows.

The signature determiner may include the jump address into the signature determination, for example, according to $S3=\mathrm{Sig}(S2,i3,\text{memory address of }i3)$ if the flow jumps to instruction i3 or $S4=\mathrm{Sig}(S2,i4,\text{memory address of }i4)$ if the flow jumps to instruction i4.

For each of the signatures possible in this way, a valid reference signature is predefined.

In this case, if a manipulation is done such that for example $S3=\mathrm{Sig}(S2,i3,\text{memory adresse }xyz)$ with some memory address xyz different from the one of i3 or $Sxyz=\mathrm{Sig}(S2,ixyz,\text{targetadresse }i3)$ with some instruction different from i3, this can be detected since these signatures will not lead to a valid reference signature.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A data processing circuit comprising:
a processor configured to carry out a computer program including a plurality of program instructions;
a signature determination circuit configured to determine a signature of the plurality of program instructions carried out by the processor;
a memory storing a reference signature predetermined for the computer program;
wherein the processor is configured to, when it carries out a program instruction of the plurality of program instructions which indicates a next program instruction of the plurality of program instructions to be carried out, provide information about the indication to the signature determination circuit;
wherein the information about the indication is a memory address of the next program instruction of the plurality of program instructions to be carried out and the signature determination circuit is configured to take into account the information about the indication such that taking into account the information about the indication negates an effect of a memory address of the program instruction of the plurality of program instructions on an update of the signature for the at least one program instruction of the plurality of program instructions if the memory address of the next program instruction of the plurality of program instructions to be carried out is equal to the memory address of the at least one program instruction of the plurality of program instructions;

wherein the signature determination circuit is configured to take into account the information about the indication in the determination of the signature; and a detection circuit configured to check, when the computer program is completely carried out, whether the determined signature is equal to the reference signature.

2. The data processing circuit of claim 1, wherein the program instruction of the plurality of program instructions which indicates the next program instruction of the plurality of program instructions to be carried out is a conditional branch.

3. The data processing circuit of claim 2, wherein the information about the indication is information about whether the branch is to be taken or not.

4. The data processing circuit of claim 1, wherein the program instruction of the plurality of program instructions which indicates the next program instruction of the plurality of program instructions to be carried out is an indirect jump.

5. The data processing circuit of claim 1, wherein the signature determination circuit is configured to update, starting from an initial value when a first program instruction of the plurality of program instructions is carried out, the signature for each program instruction of the plurality of program instructions carried out by the processor.

6. The data processing circuit of claim 5, wherein the signature determination circuit is configured to update the signature for each program instruction of the plurality of program instructions based on the program instruction of the plurality of program instructions.

7. The data processing circuit of claim 6, wherein the signature determination circuit is configured to update the signature for each program instruction of the plurality of program instructions based on a representation of the program instruction of the plurality of program instructions.

8. The data processing circuit of claim 7, wherein the signature determination circuit is configured to update the signature for each program instruction of the plurality of program instructions based on an opcode of the program instruction of the plurality of program instructions.

9. The data processing circuit of claim 1, wherein the signature determination circuit is configured to take into account the information about the indication such that the determined signature is, when the computer program is completely carried out, independent from the information about the indication if the next program instruction of the plurality of program instructions as indicated has been carried out by the processor.

10. The data processing circuit of claim 1, wherein the signature determination circuit is configured to take into account the information about the indication such that the determined signature is, when the computer program is completely carried out, equal to the reference signature if the next program instruction of the plurality of program instructions as indicated has been carried out by the processor and if the rest of the computer program has been correctly carried out.

11. The data processing circuit of claim 1, wherein the memory stores a plurality of reference signatures predetermined for the computer program and wherein the detection circuit is configured to check, when the computer program is completely carried out, whether the determined signature is equal to any of the reference signatures.

12. The data processing circuit of claim 1, wherein the signature determination circuit is configured to update the signature for at least one program instruction of the plurality of program instructions based on the program instruction of the plurality of program instructions and based on a memory address of the program instruction of the plurality of program instructions.

13. The data processing circuit of claim 1, wherein the program instruction of the plurality of program instructions which indicates the next program instruction of the plurality of program instructions to be carried out is a conditional branch and wherein the information about the indication is the information that the branch is to be been taken and the signature determination circuit is configured to take into account the information such that taking into account the information negates the difference in updates of the signature because of the program instructions of the plurality of program instructions being skipped or carried out due to the branch being taken.

14. The data processing circuit of claim 1, wherein the program instruction of the plurality of program instructions which indicates the next program instruction of the plurality of program instructions to be carried out is a conditional branch and wherein the information about the indication is information that the branch is not to be taken and the signature determination circuit is configured to take into account the information about the indication such that taking into account the information about the indication negates the difference in updates of the signature because of the program instructions of the plurality of program instructions being skipped or carried out due to the branch not being taken.

15. The data processing circuit of claim 1, wherein the signature is an instruction stream signature.

16. The data processing circuit of claim 1, wherein the processor comprises a first program flow determination circuit configured to provide, for a program instruction of the plurality of program instructions which indicates the next program instruction of the plurality of program instructions to be carried out, information about the indication to the processor and a second program flow determination circuit configured to provide, for the program instruction of the plurality of program instructions, information about the indication to the signature determination circuit.

17. The data processing circuit of claim 16, wherein the first program flow determination circuit is configured to provide the information about the indication to an instruction fetching unit of the processor.

18. The data processing circuit of claim 16, wherein the first program flow determination circuit and the second program flow determination circuit are configured to determine indication independently from each other.

19. The data processing circuit of claim 16, wherein the first program flow determination circuit is a first arithmetic logic unit and the second program flow determination circuit is a second arithmetic logic unit.

20. A method for ensuring the integrity of the execution of a computer program comprising:

storing a reference signature predetermined for the computer program;

carrying out the computer program including a plurality of program instructions;

determining a signature of the plurality of program instructions carried out by a processor wherein, when a program instruction of the plurality of program instructions is carried out which indicates a next program instruction of the plurality of program instructions to be carried out, information about the indication is taken into account in the determination of the signature;
wherein the information about the indication is a memory address of the next program instruction of the plurality of program instructions to be carried out and a signature determination circuit is configured to take into account the information about the indication such that taking into account the information about the indication negates an effect of a memory address of the program instruction of the plurality of program instructions on an update of the signature for the at least one program instruction of the plurality of program instructions if the memory address of the next program instruction of the plurality of program instructions to be carried out is equal to the memory address of the at least one program instruction of the plurality of program instructions; and
checking, when the computer program is completely carried out, whether the determined signature is equal to the reference signature.

* * * * *